United States Patent

Mason

[15] 3,651,355
[45] Mar. 21, 1972

[54] MULTI-ARMATURE MOTORS

[72] Inventor: Elmer B. Mason, 901 Vickie Drive, Oklahoma City, Okla. 73115

[22] Filed: May 8, 1970

[21] Appl. No.: 35,685

[52] U.S. Cl..............................310/112, 310/114, 310/124, 318/5
[51] Int. Cl. .....................................................H02k 17/02
[58] Field of Search....................310/112, 114, 124, 5, 6, 40, 310/40 MM, 154; 318/5

[56] References Cited

UNITED STATES PATENTS

| | | | |
|---|---|---|---|
| 3,471,729 | 10/1969 | Latta et al. | 310/112 |
| 3,510,707 | 5/1970 | Stone et al. | 310/112 |
| 2,853,637 | 9/1958 | Ishikawa | 310/40 |

Primary Examiner—D. X. Sliney
Attorney—Robert K. Rhea

[57] ABSTRACT

A direct current motor having at least two armatures arranged in parallel between parallel magnetic circuits established through the armatures independently exciting the armatures.

In one embodiment a pair of iron core coils, positioned on respective opposing sides of a pair of armatures, provides the magnetic circuit.

In another embodiment an iron core coil, interposed between two or more parallel armatures, forms the magnetic circuit. This common source of magnetic excitation forms parallel magnetic circuits wherein the motor has a dual operating characteristic in that the speed of one armature varies inversely with the speed of the other armature and vice versa until the higher speed armature reaches its critical rpm permitting the load to be increased without further change in the speed of either armature.

3 Claims, 14 Drawing Figures

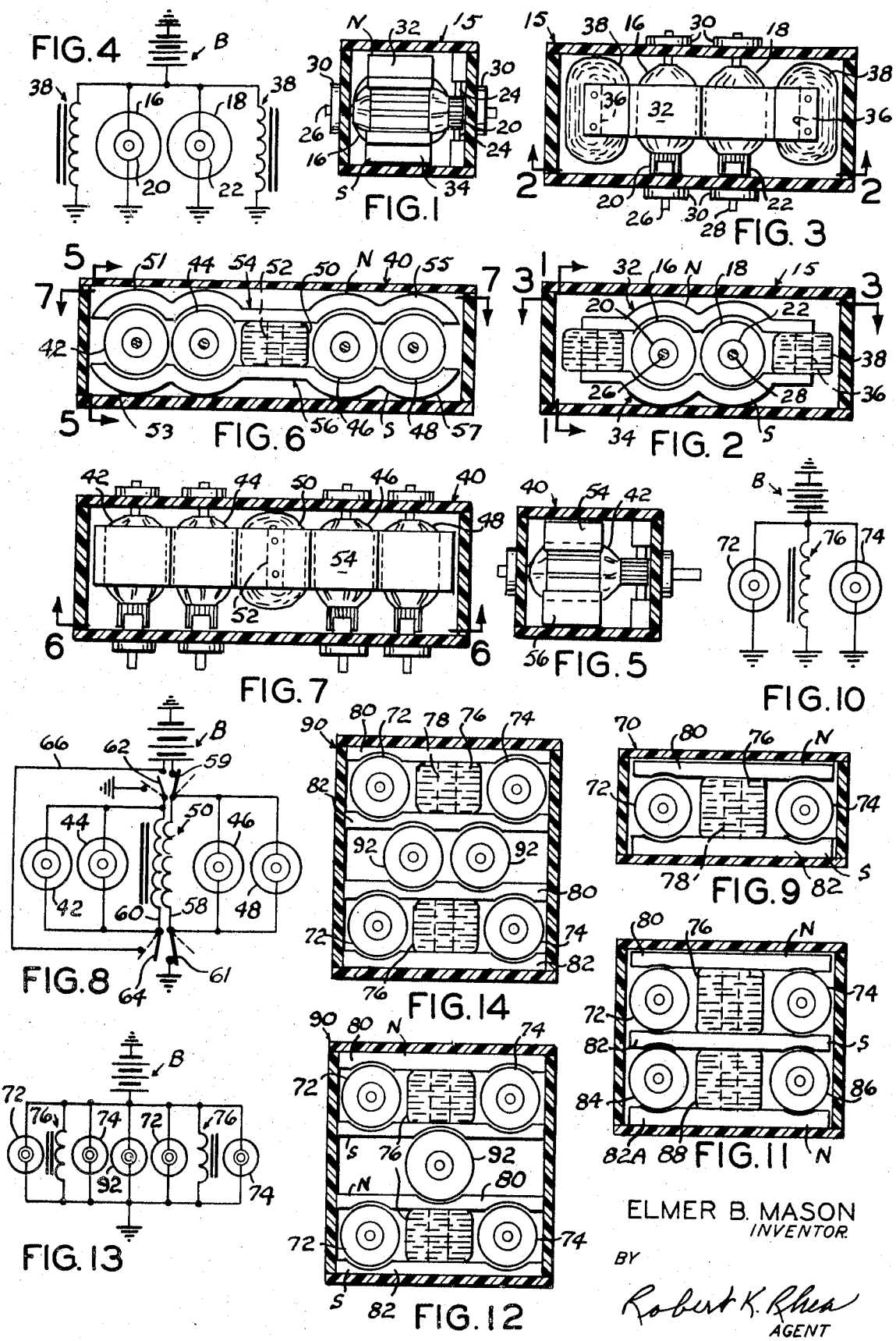

MULTI-ARMATURE MOTORS

BACKGROUND OF THE INVENTION

1. Field of the Invention

The present invention relates to direct current motors and more particularly to multi-armature motors having a single coil or dual coils establishing parallel magnetic circuits for exciting two or more parallel armatures.

Conventional direct current motors usually comprise a housing which journals an armature. Sectional field coils or stator windings contained by the housing substantially surround the armature for providing a magnetic circuit and exciting the armature. With this type of design only one armature can be operated by each group of stators or field windings resulting in inefficient utilization of the various magnetic circuits established.

2. Description of the Prior Art

U.S. Pat. Nos. 3,463,954 and 3,471,729 relate to multi-armature motors having armatures positioned between permanent magnets for establishing magnetic circuits for the armatures. These two patents primarily teach a means for mounting the armatures to eliminate their end play, as in U.S. Pat. No. 3,471,729, or for providing resilient armature bushings, as in U.S. Pat. No. 3,463,954.

This invention, on the other hand, provides one or more iron core coils for establishing parallel magnet circuits which excites the armatures of a plurality of parallel armatures disposed in the magnetic circuits.

SUMMARY OF THE INVENTION

In one embodiment of the invention a pair of juxtaposed armatures are journaled by bearings secured to opposing walls of a motor housing. A pair of iron core coils are positioned, respectively, on opposing sides of the pair of armatures with extensions of the coil cores transversely spanning the armatures on opposing sides thereof thus establishing a parallel magnetic circuit for exciting the armatures.

In another embodiment of the invention at least two armatures are supported in parallel spaced-apart relation by bearings secured to opposing walls of the housing. An iron core coil is interposed between the armatures with an extension of the coil core projecting transversely across opposing sides of each armature to provide a parallel magnetic circuit including pairs of opposite polarity for energizing the armatures.

The principal objects of the invention are to provide multi-armature electric motors eliminating bulky and complicated field windings wherein the armatures are excited by a common field in a compound manner providing high starting torque, constant speed characteristics and including the feature of the speed of one armature varying inversely with the speed of another armature and vice versa in a given operating range of the motor.

BRIEF DESCRIPTION OF THE DRAWINGS

FIG. 1 is an end elevational view, partially in section, of one embodiment of the motor taken substantially along the line 1—1 of FIG. 2;

FIG. 2 is a front elevational view of FIG. 1, partially in section, taken substantially along the line 2—2 of FIG. 3;

FIG. 3 is a top elevational view, partially in section, taken substantially along the line 3—3 of FIG. 2;

FIG. 4 is a wiring diagram of the motor shown by FIGS. 1 to 3;

FIG. 5 is an end elevational view, partially in section, of another embodiment of the motor taken substantially along the line 5—5 of FIG. 6;

FIG. 6 is a front elevational view of FIG. 5, partially in section, taken substantially along the line 6—6 of FIG. 7;

FIG. 7 is a top view of FIG. 5, partially in section, taken substantially along the line 7—7 of FIG. 5;

FIG. 8 is a wiring diagram of the motor shown by FIGS. 5, 6 and 7;

FIG. 9 is a diagrammatic front view of another embodiment of the motor;

FIG. 10 is a wiring diagram of the motor of FIG. 9;

FIG. 11 is a diagrammatic front view illustrating parallel stacking of the motors of FIG. 9;

FIG. 12 is a diagrammatic front view illustrating another embodiment of the motor of FIG. 11 in conjunction with an additional armature;

FIG. 13 is a wiring diagram of the motor of FIG. 12; and,

FIG. 14 diagrammatically illustrates another embodiment of the motor of FIG. 12.

DESCRIPTION OF THE PREFERRED EMBODIMENTS

Like characters of reference designate like parts in those figures of the drawings in which they occur.

In the drawings:

Referring to FIGS. 1 to 4, the numeral 15 indicates a rectangular housing, preferably formed of nonmagnetic material, incasing a twin armature DC motor having dual magnetic sources for excitation of the armatures. The armatures 16 and 18 are of the conventional slotted type, each having a commutator 20 and 22, respectively. Each commutator is contacted by a pair of brushes 24 supported by holders mounted in the housing in a conventional manner. Each armature has a central shaft 26 and 28, respectively, arranged in parallel juxtaposed relation and supported by bearings 30 mounted on opposing housing walls. A pair of elongated strap-like magnetic members 32 and 34 extend transversely across and beyond the armatures 16 and 18 in substantial parallel relation and are joined at their respective opposing ends by pole connecting members 36. Intermediate their ends, each of the magnetic members 32 and 34 are arcuately curved longitudinally to describe arcs extending around an arc of the periphery of each of the armatures 16 and 18 to more efficiently establish a magnetic field around opposing arcs of the circumference of each armature. An elongated strand of wire is wound around each of the pole pieces 36 to form a pair of coils 38. The coils 38 form field windings and the magnetic members 32 and 34 form effective extensions of the cores 36 and establish opposite magnetic polarities as indicated at N and S.

As shown in FIG. 4, one end of each coil 38 is connected in parallel with a battery B with the other end of the wire of each coil connected with common ground. The armatures 16 and 18 are similarly connected in parallel with the current source B.

Referring now to FIGS. 5, 6 and 7, a similar housing 40 supports a quadruple armature DC motor. In this embodiment one pair of conventional slotted armatures 42 and 44 are similarly supported in parallel juxtaposed relation at one end portion of the housing while a second pair of armatures 46 and 48 are supported in parallel juxtaposed relation at the other end portion of the housing. A common source of magnetic excitation for the four armatures comprises a coil 50 surrounding a pole piece or metallic coil core 52 connecting a pair of strap-like substantially parallel magnetic members 54 and 56 which project transversely across the two pairs of armatures on opposite sides thereof and forms opposite magnetic poles, as indicated at N and S. The left end portions (as viewed in FIG. 6) of the members 54 and 56 present a pair of spaced pole pieces 51 and 53 between which the armatures 42 and 44 are mounted. Similarly the right end portions of the members 54 and 56 form a pair of spaced pole pieces 55 and 57, respectively, between which the pair of armatures 46 and 48 are mounted. Each of the magnetic members 54 and 56 are similarly arcuately curved longitudinally so that they partially conform, in spaced relation, to an arc of the periphery of the respective armatures. The armatures 42–44 and 46–48 are similarly mounted in the housing 40 by bearings and individually contacted by pairs of brushes as described hereinabove for the twin armature motor of FIGS. 1 to 3.

As diagrammatically illustrated in FIG. 8, the coil 50 is preferably formed by wires 58 and 60 wound two-in-hand around the coil core 52. One end of one wire 58 is connected to one terminal of the battery B through a switch 59 and the other end of the wire 58 is connected to common ground through a switch 61. The other wire 60 of the coil 50 is connected at one end to the same terminal of the battery B through a switch 64 and shunt wire 66 with the other end of the wire 60 connected to the common ground through a switch 62. The pairs of switches used, 59–62 and 61–64, have their respective armatures connected together so that when one armature of a pair of switches "opens" the other armature "closes". The pair of armatures 42–44 are connected in parallel to the coil wire 60 and similarly the other pair of armatures 46–48 are connected in parallel to the coil wire 58. When the switches 59 and 61 are closed the coil wire 58 energizes magnetic members 54 and 56 form north and south pole pieces or field windings for exciting and rotating the armatures in one direction. Thus, when the armature of the switch 64 is moved to contact the wire 66 the switch 61 opens and when the switch 62 is connected to ground the switch 59 opened and terminal, current flows through the coil wire 60 in a direction opposite to previous flow through the wire 58. This reverses the polarity of the magnetic field controlling the pairs of armatures so that the armatures rotate in a direction opposite to their previous direction of rotation.

FIG. 9 diagrammatically illustrates another embodiment of the twin armature DC motor comprising a housing 70 similarly supporting a pair of armatures 72 and 74 in parallel spaced relation and including a central coil 76 interposed between the armatures. The coil 76 surrounds a pole piece 78 with opposing parallel magnetic members 80 and 82 forming an extension of the pole piece 78 which spans the respective armatures 72 and 74 and establishes pairs of pole pieces of opposite polarity for each armature. The magnetic members 80 and 82 are each provided with transverse arcuate recesses adjacent their respective ends surrounding a peripheral arcuate portion of the respective armature for increasing the excitation of the armature windings.

FIG. 10 illustrates the wiring diagram of the motor of FIG. 9 wherein the field coil 76 is connected at one end with the positive terminal of the battery B with its opposite end connected to the common ground. The commutators of the armatures 72 and 74 are connected in parallel to the battery and ground.

The parallel connection of the field coil 76 and armatures 72 and 74 provides a dual output of the twin armature motor of FIG. 9. One of these armatures, for example, the armature 72 may be connected in series with a parallel combination of the armature 74 and field coil 76 to deliver a single output. The armature shafts would then be mechanically connected as by a belt and pulley arrangement thereby forming a compound armature connection. This compound armature arrangement provides high starting torque without danger of excessive armature current, and constant speed over a wide load variation. This electrical arrangement similarly may be utilized with the armatures of FIG. 8 to provide quadruple outputs when the switches 62 and 64 are closed. For example, the two armatures 42 and 44 may be connected in parallel with each other and the field winding with the other two armatures 46 and 48 connected in series with the parallel combination. All of the armature shafts would be interconnected for rotation in unison to provide a common output.

When using either of the armature and field arrangements of FIGS. 4 and 10, a multioutput characteristic may be obtained, for example, assume that one of the armatures is loaded while the other armature is allowed to run with little or no load, the less loaded armature will rotate at a higher r.p.m. which increases at the rate the other armature decreases in r.p.m. with the increase in its load. Stated another way, one of the armatures varies its rate of rotation inversely with changes in the rate of rotation of the other armature and vice versa. The substantially parallel arrangement of the magnetic members establishes parallel magnetic circuits across the respective armature. Each armature is thus individually excited and constitutes parallel reluctances between the pairs of pole pieces with each such reluctance being subject to variation in accordance with armature speed or load changes. In this manner the inverse speed variation set forth hereinabove may be obtained. However, at a critical speed of the rotation of the less loaded armature the external field exciting the high speed armature is mostly cancelled and the greater portion of the magnetic field shifts to the loaded armature thereby proportionally increasing its load capacity. The armature field, due to counter electromotive force generated by the less loaded armature, increases as the armature reaches its critical r.p.m. thus the exciting field across the loaded armature is increased to a maximum. This action occurs at saturation of the less loaded armature and at this point the load on the loaded armature may be increased without a further decrease in the speed of the loaded armature. While increasing the load on the loaded armature the speed of the less loaded armature remains constant. Thus the twin armature embodiment of the motor provides selective dual operating characteristics utilizable for a given application.

Additionally the motor of FIGS. 1 to 3 may be modified by simply extending the metallic members 32 and 34 beyond the respective coils 38 a distance sufficient to receive an additional pair of armatures similarly disposed and supported, respectively, outwardly of the coils 38 and between the respective pairs of end portions of the metallic members 32 and 34. These two additional armatures are similarly connected in parallel with the current source and the coils 38. This embodiment of the twin armature motor has the feature that the two centermost armatures will have a rate of rotation equal to the armature manufacturer's specifications while the two outermost armatures will rotate at substantially twice the rate of rotation of the two centermost armatures. Furthermore, in this embodiment the direction of current may be changed, in one coil, to flow in a direction opposite the direction of current in the other coil thus resulting in the rate of rotation of all four armatures being equal.

FIG. 11 illustrates a stack arrangement of the twin armatures motor of FIG. 9 wherein the magnetic member 82 forms a common source of excitation for the armatures 72 and 74 and an additional pair of armatures 84 and 86 similarly having a coil 88 interposed therebetween and an additional magnetic member 82A. The magnetic members 80, 82 and 82A form north and south poles, as indicated on the drawings, with the south pole forming magnetic member 82 being common to all four armatures.

FIG. 12 illustrates a further modification wherein two of the motors of FIG. 9, each comprising the armatures 72 and 74, coil 76 and magnetic members 80 and 82, are positioned in vertically spaced relation within a boxlike housing 90. A fifth armature 92, which may be greater in diameter than the other four, is then interposed between the pair of vertically spaced twin motors and supported by the housing 90 with the longitudinal axis of the armature 92 parallel with respect to the axes of the other armatures. The armature 92 thus utilizes the magnetic field established by the adjacent magnetic members 82 and 80.

FIG. 13 diagrammatically illustrates the wiring diagram of the motor of FIG. 12 wherein the coils and armatures are connected in parallel to the positive terminal of the battery B and to common ground.

FIG. 14 diagrammatically illustrates a further modification of the motor of FIG. 12 wherein a pair of the armatures 92 are interposed in parallel between the vertical spaced pairs of twin armature motors of FIG. 9.

Obviously the invention is susceptible to changes or alterations without defeating its practicability, therefore, I do not wish to be confined to the preferred embodiment shown in the drawings and described herein.

I claim:
1. A multimotor assembly, comprising:
   a housing having opposing walls;
   first and second generally parallel elongated metallic members forming spaced-apart magnetizable pole pieces, said metallic members each having arcuate portions intermediate their ends, the arcuate portions in one said metallic member being aligned in confronting relation with like arcuate portions in the other said metallic member and forming a plurality of armature receiving openings extending transversely of the longitudinal axis of said metallic members;

a like plurality of armatures arranged within the armature receiving openings between said metallic members, said armatures each having a shaft, each said shaft being journaled by said walls;

coil core means extending between and connected with said metallic members medially their ends;

a pair of coil wires wound around said core means to form a coil, said armatures being disposed on both sides of said core means; and, circuit means connecting a source of electrical energy with said coil in parallel with said armatures, said circuit means including switch means passing current through one said coil wire in one direction when said switch means is in one position and passing current through the other said coil wire in an opposite direction when said switch means is in another position, whereby polarity of the magnetic field of said metallic members may be reversed for reversing said armatures.

2. A multimotor assembly, comprising:

a housing having opposing walls;

first and second generally parallel elongated metallic members forming spaced-apart magnetizable pole pieces, said metallic members each having arcuate portions intermediate their ends, the arcuate portions in one said metallic member being aligned in confronting relation with like arcuate portions in the other said metallic member and forming a plurality of armature receiving openings extending transversely of the longitudinal axis of said metallic members;

a like plurality of armatures arranged within the armature receiving openings between said metallic members, said armatures each having a shaft, each said shaft being journaled by said walls;

a coil core member extending between and connected with said metallic members adjacent their respective opposing end portions, a wire wound around each said core member to form a first pair of coils, said armatures being disposed between said core members;

a third elongated metallic member disposed in parallel relationship with said first and second metallic members with said second metallic member being disposed between said third metallic member and said first metallic member;

a second plurality of armatures journaled by said walls between said second and said third metallic members;

a second pair of coils common to all of said second plurality of armatures and rendering said third metallic member opposite in magnetic polarity to said second metallic member; and, circuit means connecting a source of electrical energy with said first and second pairs of coils in parallel with said armatures.

3. A multimotor assembly, comprising:

a housing having opposing walls;

first and second generally parallel elongated metallic members forming spaced-apart magnetizable pole pieces;

a plurality of armatures arranged in parallel and extending transversely between said metallic members, said armatures each having a shaft, each said shaft being journaled by said walls;

coil core means extending between and connected with said metallic members medially their ends;

a coil wire wound around said core means to form a first coil, said armatures being disposed in close spaced relation on both sides of said core means;

a third elongated metallic member disposed in parallel relationship with said first and said second metallic members with said second metallic member being disposed between said third metallic member and said first metallic member;

a second plurality of armatures journaled by said walls between said second and said third metallic members;

a second coil common to all of said second plurality of armatures for rendering said third metallic member opposite in magnetic polarity to said second metallic member; and, circuit means connecting a source of electrical energy with said coils in parallel with said armatures.

* * * * *